United States Patent Office 3,130,211
Patented Apr. 21, 1964

1

3,130,211
6-CHLORO-1-DEHYDRO STEROID
COMPOUNDS
George B. Spero, Kalamazoo Township, Kalamazoo
County, Mich., assignor to The Upjohn Company, Kalamazoo, Mich., a corporation of Michigan
No Drawing. Original application Jan. 18, 1957, Ser.
No. 634,828, now Patent No. 2,841,600, dated July 1,
1958. Divided and this application Mar. 19, 1958,
Ser. No. 722,378
9 Claims. (Cl. 260—397.45)

This invention relates to 6-halo-1-dehydrohydrocortisone and 21-esters thereof, to 6-halo-1-dehydrocortisone and 21-esters thereof, to novel intermediates in the production thereof and to processes for the production of the novel compounds and the novel intermediates.

This application is a continuation-in-part of application Serial No. 519,632, filed July 1, 1955, now Patent 2,838,532, and a division of application Serial No. 634,-828, filed January 18, 1957, now Patent 2,841,600.

It has been discovered that 6-halo-1-dehydrohydrocortisone and the 21-esters thereof possess valuable antirheumatoid arthritic, anti-inflammatory and glucocorticoid activity. The compounds are useful in the treatment of inflammatory conditions of the skin, eyes and ears of humans and valuable domestic animals, contact dermatitis and other allergenic reactions. The compounds can be administered in conventional dosage forms such as pills, tablets and capsules for oral use or in conventional liquid forms as are used with natural and synthetic cortical steroid hormones for injection use. For topical use they can be administered in the form of ointments, creams, lotions and the like with or without co-acting antibiotics, germicides and the like.

The compounds of this invention can be prepared in accordance with the following scheme of reactions:

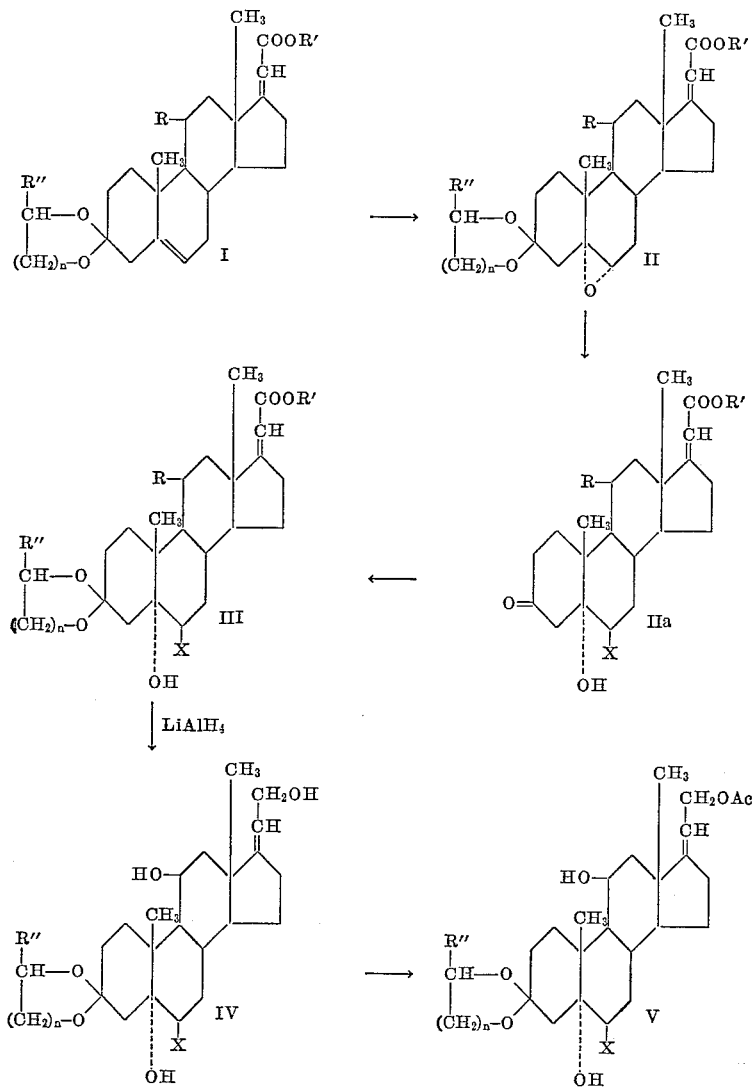

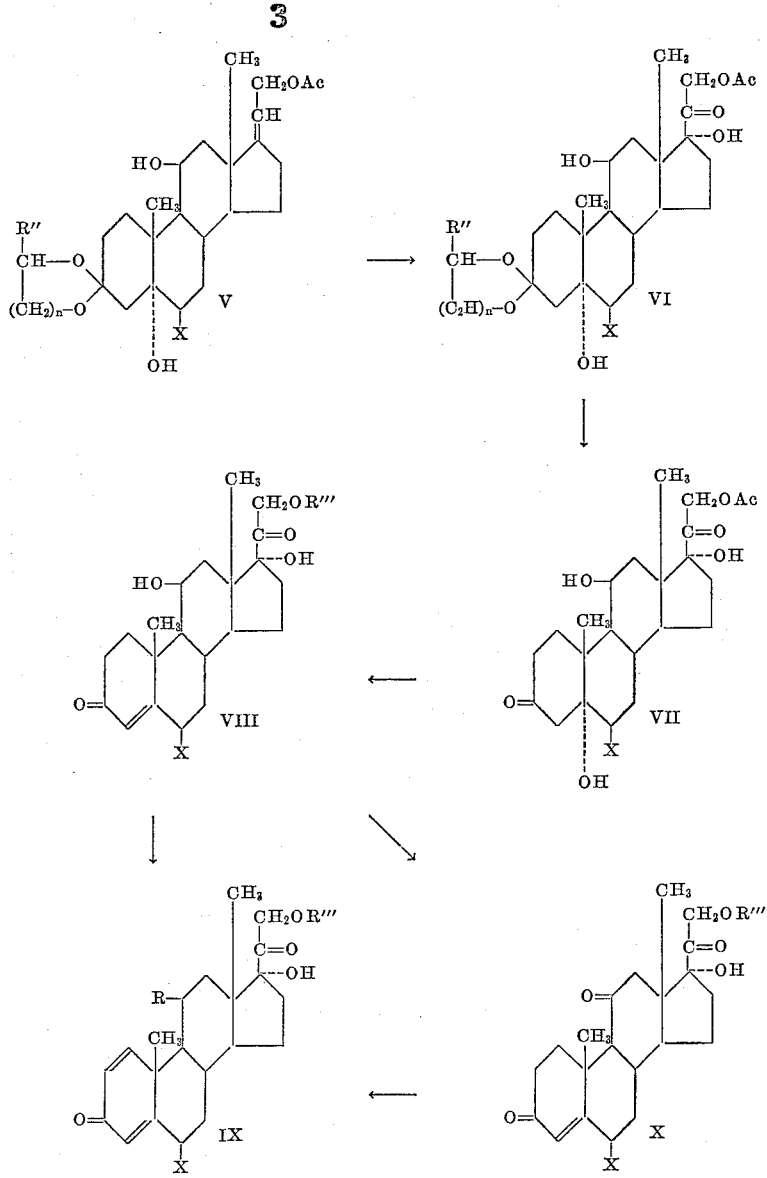

wherein R is β-hydroxy or keto, R′ and R″ are hydrogen or lower-alkyl, n is a whole number from one to two, X is a halogen having an atomic weight from nineteen to eighty, inclusive, i.e., fluorine, chlorine or bromine, Ac is the acyl radical of a hydrocarbon carboxylic acid containing from one to twelve carbon atoms, inclusive, and R‴ is hydrogen or Ac as defined above. The term lower-alkyl, when used herein, refers to an alkyl radical of from one to eight carbon atoms, inclusive, e.g., methyl, ethyl, propyl, butyl, amyl, hexyl, heptyl, ethylhexyl, and octyl.

Oxidation of the product, 6-halo-1-dehydrohydrocortisone 21 - acetate or other 21 - esters, e.g., with chromic acid in acetic acid, is productive of the 21-esters of 6-halo-1-dehydrocortisone, which compounds also possess glucocorticoid, anti-inflammatory and antirhemutaoid arthritic activity.

The above reactions as described hereinbelow are embodiments of steps which will be exemplified in detail in the ensuing specification. It will be understood by those skilled in the art, nevertheless, that the specific order of steps may be inverted or transposed or otherwise varied to suit the purposes of economics, convenience, or the like.

The preferred compounds containing the 17(20)-double bond have the cis configuration, because the cis isomers can ultimately be converted in higher yields in the oxidative hydroxylation step than is ordinarily possible with the trans isomer. It should be understood, however, that the trans isomer or mixtures of the cis and trans isomers can be used with satisfactory results.

In carrying out the epoxidation step shown above, a 3-ketal of 3-keto-11-oxygenated-4,17(20)-pregnadiene-21-carbonyloxy steroid represented by Formula I, which can be prepared as disclosed in U.S. Patent 2,707,184, preferably the 3-ethylene glycol ketal of methyl 3,11-diketo-4,17(20)-[cis]-pregnadien-21-oate, is epoxidized with a peracid, e.g., peracetic or perbenzoic, or other known epoxidizing agents, to produce the corresponding 5:6-oxide (II). A mixture of both the α- and β-oxides is produced in this epoxidation reaction, and the mixture can be separated by chromatographic or crystallization techniques known in the art.

In the oxide opening step, a 3-ketalized 3-keto-5α,6α-oxido-11-oxygenated-17(20)-pregnene - 21 - carbonyloxy steroid (II), is reacted with hydrogen fluoride, hydrogen chloride, or hydrogen bromide, preferably hydrogen fluoride, to open the oxide ring and produce the corresponding 3-ketalized 3-keto-5-hydroxy-6-halo-11-oxygenated-17(20)-pregnene-21-carbonyloxy steroid (III). This epoxide opening step is ordinarily carried out at temperatures between about minus forty and plus fifty degrees centigrade, the preferred limits being between about zero and 25 degrees centigrade. It can be performed under anhydrous conditions in the presence or absence of a catalyst, e.g., boron trifluoride; or under aqueous conditions in the presence or absence of a catalyst such as a hypohalous acid. Reaction conditions, for example, those disclosed by Schmidlin et al., Helv. Chim. Acta, 36, 1241 (1953); Gallagher, J. Biol, Chem., 162, 495 (1946); Cornforth et al., J. Chem. Soc., 1954, 907 and Fried et al., J. Am. Chem. Soc., 75, 2273 (1953), are usually employed.

If anhydrous conditions are difficult or inconvenient to maintain, the oxide opening reaction can be performed under aqueous conditions in which case the ketal will be hydrolyzed at the same time. The thus-produced 3-keto group of IIa can then be reketalized in the manner described hereinabove to produce the corresponding ketal (III).

In the reduction step of the present invention, a 3-ketalized 3 - keto-5-hydroxy-6-halo-11-oxygenated - 17(20)-pregene-21-carbonyloxy steroid (III), preferably the 3-ethylene glycol ketal of lower-alkyl, preferably methyl 3,11 - diketo - 5-hydroxy-6-fluoro - 17(20)-[cis]-pregnen-21-oate, is reduced with lithium aluminum hydride or other chemical carboxyl reducing agent in an organic solvent, e.g., ether, dioxane, tetrahydrofuran, benzene, to produce the corresponding 3-ketalized 5,11β,21-trihydroxy-6-halo-17(20)-pregnen-3-one. At completion of this reaction, the reaction mixture is preferably mixed with water or, an acid, an ester or carbonyl agent followed by water, to decompose any excess lithium aluminum hydride and organo-metal complexes. The usual reaction conditions for a lithium aluminum hydride reduction are employed, except that a reaction temperature at room temperature or below is preferred, to ensure that reaction with the 6-halogen does not occur, and acid, though operative and satifsactory under carefully controlled conditions, is preferably not employed in the decomposition step, to avoid undue hydrolysis of the ketal group.

The esterification step, i.e., to produce Compound V, involves the conversion of a 21-hydroxy group of 5,11β, 21 - trihydroxy-6-halo-17(20)-pregnen-3-one 3-alkylene ketal (IV) to a 21-acyloxy group. This reaction can be performed under the esterification conditions known in the art, e.g., by the reaction of IV with the selected acid halide or acid chloride or acid bromide or the anhydride of a hydrocarbon carboxylic acid, or by reaction with the selected acid, in the presence of an esterification catalyst or with an ester under ester exchange reaction conditions. Reaction conditions which are apt to affect the labile 11β-hydroxy group or 6-halo group should be avoided. Compounds thus-produced include the compounds represented by Formula V wherein the 17(20)-configuration is cis, the 6-halogen is fluorine and the Ac is the acyl radical of a hydrocarbon carboxylic acid containing from one to twelve carbon atoms, inclusive, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylideneacetic, cyclopentylformic, cyclopentylacetic, β-cyclohexylpropionic, cyclohexylformic, cyclohexylacetic, an aryl or alkaryl acid, e.g., benzoic, 2-, 3- or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralykyl acid, e.g., phenylacetic, phenylpropionic, diphenylacetic, triphenylacetic, etc.

The oxidative hydroxylation of V to VI is carried out by reaction with a catalytic amount of osmium tetroxide and an oxidizing agent such as hydrogen peroxide, peracids, alkyl peroxides, amine oxide peroxides, and the like. A preferred procedure involves the use of two to three molar equivalents of one of the oxidizing agents and less than 0.05 molar equivalent of osmium tetroxide, calculated on the basis of V, using tertiary butyl alcohol as the reaction medium and carrying out the reaction at about room temperature.

The hydrolysis step (VI→VII) involves the hydrolysis of the ketal group of the 3-ketalized 5,11β,17α-trihydroxy-6-halo-21-acyloxypregnane-3,20-dione (VI), preferably the ethylene glycol ketal thereof, employing aqueous acid to produce the corresponding diketo compound VII. The hydrolysis is conveniently performed under relatively mild conditions, e.g., at room temperature with acetic acid or weak sulfuric acid.

The dehydration reaction is carried out using hydrogen chloride or Girard's Reagent T. Acetic anhydride, p-toluene-sulfonic acid and acetic acid, or thionyl chloride and pyridine are also suitable as dehydrating agents. Care should be taken in this step to avoid various reaction conditions that would affect the 11β-hydroxy group.

The 1-dehydrogenation of VIII to IX (where R is a β-hydroxy group) can be carried out microbiologically, i.e., fermentative 1-dehydrogenation using Septomyxa or Fusarium organisms. If loss of the 21-ester takes place during the fermentation, reacylation can be done by known 21-acylation methods. Alternatively, the 1-dehydrogenation can be carried out chemically in known manner by using selenium dioxide.

Alternatively, Compound VIII in the form of the 21-ester can be oxidized to the corresponding 11-keto compound, i.e., 17α-hydroxy-6-halo-21-acyloxy-3,11,20-trione (Compound X), in accordance with the process for the oxidation of the 21-esters of Kendall's Compound F as disclosed in U.S. Patent No. 2,751,402. Compound X can be subjected to 1-dehydrogenation in the same manner as Compound VIII thus producing 17α-hydroxy-6-halo-21-acyloxy - 1,4 - pregnadiene - 3,11,20 - trione (IX) where R is a keto group.

Either of Compounds VIII, IX or X can be transformed to the free 21-alcohol by hydrolysis in accordance with known methods for hydrolyzing Compound F 21-esters to the free Compound F alcohol. A preferred procedure is to employ at least a molar equivalent of an alkali-metal bicarbonate in a substantially oxygen-free solution of a mixture of a lower alkanol and water. The hydrolysis reaction is carried out at a temperature between ten and thirty degrees centrigrade while protecting the mixture from atmospheric oxygen. After the hydrolysis is complete, the reaction mixture is neutralized with an acid, e.g., acetic acid, and the hydrolyzed product recovered from the reaction mixture by evaporation and crystallization, extraction with methylene chloride, or the like.

As previously mentioned, the order of the various steps outlined above can be varied considerably. Suitable variations will occur to those skilled in the art, and the necessary adjustments can be readily appreciated and carried out by skilled chemists. For example, Compound IV can be hydrolyzed to remove the 3-ketal, and this step followed in turn by 21-acylation, 5-dehydration, oxidative hydroxylation and 1-dehydrogenation under the above-described conditions.

The compounds represented by Formula IX and those represented by Formulas VIII and X, in addition to possessing the valuable anti-rheumatoid arthritic, anti-inflammatory and glucocorticoid activity heretofore mentioned, are additionally useful as intermediates for the preparation of the 9α-halo analogues thereof, namely 9α,6-dihalo-17α,21-dihydroxy-4-pregnene-3,11,20-trione, 9α,6-dihalo-11β,17α,21-trihydroxy - 4 - pregnene-3,20-dione including the corresponding 21-esters thereof; and 9α,6-dihalo-17α, 21-dihydroxy-1,4-pregnadiene-3,11,20-trione, and 9α,6-dihalo-11β,17α,21-trihydroxy - 1,4 - pregnadiene-3,20-dione including the corresponding 21-ester thereof. These dihalo compounds also possess the valuable anti-rheumatoid arthritic, anti-inflammatory and glucocorticoid activity of the parent 6-halo compounds, usually in higher degree. They possess a combination of high anti-inflammatory and glucocorticoid properties and at the same time possess low mineralocorticoid properties.

In the preparation of these compounds, for example, 6-fluoro-11β,17α-dihydroxy - 21 - acetoxy-1,4-pregnadiene-3,20-dione of the class of Formula IX can be dehydrated with N-bromoacetamide and anhydrous sulfur dioxide until a negative acidified potassium iodide-starch test of the reaction mixture is obtained. Dilution with cold water, e.g., ice water, results in the precipitation of 6-fluoro-17α-hydroxy-21-acetoxy - 1,4,9(11) - pregnatriene-3,20-dione which can be purified with recrystallization from acetone. The crystalline product can then be reacted in methylene chloride-tertiary butyl alcohol solution with perchloric acid and N-bromoacetamide or N-iodosuccinimide to produce a reaction mixture from which 6-fluoro-9α-bromo-11β,17α-dihydroxy-21-acetoxy-1,4-pregnadiene-3,20-dione or the corresponding 6-fluoro-9α-iodo compound, respectively, can be recovered by precipitation with ice water and recrystallization from acetone. The latter compounds can be reacted in acetone solution with anhydrous potassium acetate at reflux temperature to produce 6-fluoro-9β,11β-oxido-17α-hydroxy-21-acetoxy-1,4-pregnadiene-3,20-dione which is recoverable from the reaction mixture by chromatographic methods and can be purified by recrystallization from a Skellysolve B hexane hydrocarbons-acetone mixture. Reaction of the latter in methylene chloride solution with aqueous hydrogen fluoride at room temperature is productive of 9α,6-difluoro-11β,17α-dihydroxy - 21 - acetoxy-1,4-pregnadiene-3,20-dione. Substitution of aqueous hydrogen chloride, and carrying out the reaction at lower temperatures, e.g., minus five degrees centigrade, is productive of 9α-chloro-6-fluoro-11β,17α-dihydroxy-21-acetoxy-1,4-pregnadiene-3,20-dione.

Substitution of 6-fluoro-11β,17α-dihydroxy-21-acetoxy-4-pregnene-3,20-dione in the foregoing process is productive of the analogous resulting intermediate products, i.e., possessing the 3-keto-Δ⁴-structure in the A-ring of the steroid molecule instead of the 3-keto-Δ¹,⁴-structure, and results in 9α,6-difluoro-11β,17α-dihydroxy-21-acetoxy-4-pregnene-3,20-dione and the corresponding 9α-chloro compound, respectively.

The compounds, 9α,6-dihalo-17α-hydroxy-21-acyloxy-4-pregnene-3,11,20-trione (made in accordance with the process of the foregoing paragraphs, using as starting material 6-halo-17α-hydroxy-21-acyloxy-4-pregnene-3,11,20-trione) and 9α,6-dihalo-11β,17α-dihydroxy-21-acyloxy-4-pregnene-3,20-dione, can be utilized as starting material for the corresponding 9α,6-dihalo-17α-hydroxy-21-acyloxy-1,4-pregnadiene-3,11,20-trione and 9α,6-dihalo-11β,17α-dihydroxy-21-acyloxy - 1,4 - pregnadiene-3,20-dione by fermentative 1-dehydrogenation using Septomyxa or Fusarium organisms or by chemical 1-dehydrogenation using selenium dioxide under the conditions previously described for the 1-dehydrogenation of Compound VIII to Compound IX.

The 9α,6-difluoro-11β,17α-dihydroxy - 21 - acetoxy-1,4-pregnadiene-3,20-dione or the 9α-chloro analogue thereof can be oxidized with chromic acid in accordance with known methods for converting Kendall's Compound F 21-esters to Kendall's Compound E 21-esters to produce 9α,6-difluoro-17α-hydroxy - 21 - acetoxy-1,4-pregnadiene-3,11,20-trione and 9α-chloro-6-fluoro-17α-hydroxy-21-acetoxy-1,4-pregnadiene - 3,11,20 - trione, respectively. In a similar manner, the above compounds possessing the 3-keto-Δ⁴-structure in the A-ring can be oxidized with chromic acid to produce 9α,6-difluoro-17α-hydroxy-21-acetoxy-4-pregnene-3,11,20-trione and 9α-chloro-6-fluoro-17α-hydroxy-21-acetoxy-4-pregnene-3,11,20-trione, respectively.

The foregoing dihalo compounds can be hydrolyzed to the corresponding 21-hydroxy compounds according to known methods for hydrolyzing Compound F 21-acetate to Compound F, for example, in aqueous solution with potassium bicarbonate under oxygen-free conditions. The free 21-hydroxy compounds can be reesterified to produce the corresponding 21-acyloxy compounds, using an esterifying agent, e.g., the anhydride or acid halide of an organic carboxylic acid containing from one to twelve carbon atoms, inclusive, in the same manner as disclosed above for the monohalogenated analogs of hydrocortisone.

The foregoing Compounds VIII, IX or X and their 9α-halo analogues, all characterized by the presence of a 6-fluoro or other 6-halo substituent, can exist in either the 6α- or the 6β-epimeric form. The foregoing process produces a mixture in which the 6β-form predominates. The 6α-epimer can be separated from the products by chromatographic or fractional crystallization techniques known in the art. The compounds are useful, however, as such in the mixtures as produced directly from the synthesis steps described. It is occasionally desirable, nevertheless, to produce from the mixture by separation or by epimerization the 6α-epimer which possesses even higher activity than the 6β-epimer. Conversion of the 6β-epimer or mixtures predominating therein can be accomplished by treatment at temperatures of zero degrees centigrade or slightly below in an essentially anhydrous liquid medium with an anhydrous mineral acid, such as hydrochloric acid. The mixture should be maintained at temperatures below zero degrees centigrade, or at least below room temperature during the addition of the acid. The reaction mixture can then be washed with successive portions of dilute alkali and water, and then dried and evaporated under reduced pressure. The 6α-fluoro, 6α-chloro or 6α-bromo products can be recovered from the crude reaction product and purified by recrystallization.

The following examples are illustrative of the process and products of the present invention, but are not to be construed as limiting.

*Example 1.—The 3-Ethylene Glycol Ketal of Methyl 3, 11-Diketo-5α,6α-Oxido-17(20)-[Cis]-Pregnen-21-Oate*

To a solution of 5.0 grams of the 3-ethylene glycol ketal of methyl 3,11-diketo-4,17(20)-[cis]-pregnadien-21-oate, prepared in the manner described in U.S. Patent 2,707,184, in 100 milliliters of chloroform was added a chilled solution of 1.9 grams of perbenzoic acid dissolved in 31.5 milliliters of chloroform. The solution was maintained at about four degrees centigrade for 24 hours, and then at room temperature for 72 hours. The solution was then washed with a five percent aqueous solution of sodium bicarbonate and then with water. The chloroform layer was separated, dried and the solvent distilled to give a residue of 5.3 grams of solid. Crystallization of this solid from methanol gave 2.24 grams of product melting at 180 to 195 degrees centigrade and after two crystallizations from methanol, there was obtained pure 3-ethylene glycol ketal of methyl 3,11-diketo-5α,6α-oxido-17(20)-[cis]-pregnen-21-oate melting at 206 to 209 degrees centigrade having an $[\alpha]_D$ of 37 degrees (CHCl₃) and having the analysis given below:

Calculated for $C_{24}H_{32}O_6$: C, 69.20; H, 7.75. Found: C, 69.59; H, 7.81.

*Example 2.—Methyl 3,11-Diketo-5α,6β-Dihydroxy-17 (20)-Allopregnen-21-Oate and Methyl 3,11-Diketo-5α-Hydroxy-6β-Fluoro-17(20)-Allopregnene-21-Oate*

To a solution of 1.73 grams of 3-ethylene glycol ketal of methyl 3,11-diketo-5α,6α-oxido-17(20)-[cis]-pregnen-21-oate in sixteen milliliters of methylene chloride was added six milliliters of 48 percent hydrofluoric acid. The heterogenous mixture was stirred for two hours, made slightly basic with 300 milliliters of five percent sodium bicarbonate solution, and extracted with methylene chloride. The extract was washed, dried, and evaporated to dryness to give 1.62 grams of crude solid. Chromatography gave two fractions: (A) 481 milligrams eluted with methylene chloride plus five percent acetone and (B) 921 milligrams eluted with methylene chloride plus ten and twenty percent acetone. Crystallization of fraction (A) from acetone-Skellysolve B hexanes gave 390 milligrams of methyl 3,11-diketo-5α-hydroxy-6β-fluoro-17(20)-allopregnen-21-oate, melting point 254 to 260 degrees centigrade. The analytical sample melted at 260 to 263 degrees centigrade.

*Analysis.*—Calculated for $C_{22}H_{29}O_5F$: F, 4.84. Found: F, 4.47.

Fraction (B) on crystallization from acetone-Skellysolve B hexanes gave 470 milligrams of methyl 3,11-diketo-5α,6β-dihydroxy-17(20)-allopregnen - 21 - oate, melting point 235 to 245 degrees centigrade. The analytical sample melted at 245 to 248 degrees centigrade.

*Analysis.*—Calculated for $C_{22}H_{30}O_6$: C, 67.67; H, 7.74. Found: C, 67.91; H, 7.62.

Following the procedure described in Example 2 but substituting hydrogen chloride at zero degrees centigrade for the hydrogen fluoride, there is thus produced methyl 3,11-diketo - 5α - hydroxy-6β-chloro-17(20)-allopregnen-21-oate, recoverable as a white crystalline solid from the reaction mixture by chromatography and crystallization from acetone-Skellysolve B hexanes.

*Example 3.—Methyl 3,11-Diketo-5α-Hydroxy-6β-Fluro-17(20)-Allopregnen-21-Oate 3-Eethylene Ketal*

A mixture of 1.9 grams of methyl 3,11-diketo-5α-hydroxy-6β-fluoro - 17(20)-allopregnen-21-oate, 59 milligrams of p-toluene-sulfonic acid monohydrate and 31 milliliters of distilled ethylene glycol was added to 800 milliliters of benzene. The mixture was stirred and refluxed for two hours, with the condensate passing through a water trap to remove the water. After reflux the mixture was cooled, washed with water and evaporated to dryness to give a crude solid which on recrystallization from acetone-Skellysolve B hexanes gave 1.96 grams of methyl 3,11-diketo-5α-hydroxy-6β-fluoro-17(20) - allopregnen-21-oate 3-ethylene ketal, melting point 170 to 173 degrees centigrade.

Following the above procedure, substituting other dihydric alcohols for ethylene glycol, for example, 1,2-propylene glycol, 2,3-butanediol, 1,3-butanediol and 2,3-pentanediol is productive of the respective 3-alkylene ketals of methyl 3,11-diketo-5α-hydroxy-6β-fluoro-17(20)-allopregnen-21-oate.

*Example 4.—5α,11β,21-Trihydroxy-6β-Fluoro-17(20)-Allopregnen-3-One 3-Ethylene Ketal*

To a solution of 1.96 grams of methyl 3,11-diketo-5α-hydroxy-6β-fluoro-17(20)-allopregnen-21-oate 3-ethylene ketal in 850 milliliters of anhydrous ether was added 3.7 grams of lithium aluminum hydride and the mixture was stirred for a period of one hour. 200 milliliters of water was added slowly and the ether phase separated. The aqueous phase was extracted with ethyl acetate and the extracts added to the ether phase. The combined ether-ethyl acetate solution was washed with water, dried and evaporated to dryness under reduced pressure. The crude solid residue was crystallized from acetone-Skellysolve B hexanes to give 1.30 grams of 5α,11β,21-trihydroxy-6β-fluoro-17(20)-allopregnen-3-one 3-ethylene ketal, melting point 197 to 205 degrees centigrade. An additional 226 milligrams was obtained from the mother liquor, melting point 175 to 185 degrees centigrade.

*Example 5.—5α,11β-Dihydroxy-6β-Fluoro-21-Acetoxy-17(20)-Allopregnen-3-One 3-Ethylene Ketal*

The acetate was prepared by allowing 0.87 gram of 5α,11β,21 - trihydroxy - 6β - fluoro - 17(20) - allopregnen-3-one 3-ethylene ketal to stand overnight in ten milliliters of acetic anhydride and ten milliliters of pyridine. The solution was then poured into ice water to give 0.92 gram of 5α,11β-dihydroxy-6β-fluoro-21-acetoxy-17(20)-allopregnen-3-one 3-ethylene ketal, melting point 140 to 150 degrees centigrade, which on recrystallization from acetone-Skellysolve B hexanes gave 0.77 gram, melting point 149 to 153 degrees centigrade.

Similarly, other 21-organic carboxylic esters of 5α,11β,21 - trihydroxy-6β-fluoro-17(20)-allopregnen-3-one 3-ethylene ketals are prepared wherein the 21-acyloxy group is formyloxy, propionyloxy, butyryloxy, valeryloxy, hexanoyloxy, heptanoyloxy, octanoyloxy, benzoyloxy, phenylacetoxy, or the like, by contacting 5α,11β,21-trihydroxy-6β-fluoro-17(20)-pregnen-3-one 3-ethylene ketal with an appropriate acylating agent, e.g., the anhydride or acid halide of the selected acid in a solvent such as, for example, benzene, toluene, acetic acid, or the like. A convenient method of preparing the 21-formyloxy ester consists in contacting 5α,11β,21 - trihydroxy-6β-fluoro-17(20)-pregnen-3-one 3-ethylene ketal with formic acid in the presence of para-toluenesulfonic acid.

*Example 6.—5α,11β,17α-Trihydroxy-6β-Fluoro-21-Acetoxyallopregnane-3,20-Dione 3-Ethylene Ketal*

To a solution of 0.77 gram of 5α,11β-dihydroxy-6β-fluoro - 21 - acetoxy-17(20)-allopregnen-3-one 3-ethylene ketal in 35 milliliters of tertiary butyl alcohol was added one milliliter of pyridine, 1.9 milliliters of N-methylmorpholine oxide peroxide solution, and 13.1 milligrams of osmium tetroxide (9.1 milliliters of tertiary butyl alcohol solution containing 1.44 milligrams $OsO_4$ per milliliter). The solution was stirred for a period of 2.5 hours, fifteen milliliters of five percent sodium hydrosulfite added, stirred for an additional ten minutes, 0.7 gram of finely ground synthetic magnesium silicate added, stirred for a period of twenty minutes more and filtered. The filtrate was taken to dryness under reduced pressure (below fifty degrees centigrade) and the residue dissolved in methylene chloride, washed with water, dried and evaporated to dryness. This residue was crystallized from acetone-Skellysolve B hexanes to give 0.47 gram of 5α,11β,17α - trihydroxy-6β-fluoro-21-acetoxyallopregnane-3,20-dione 3-ethylene ketal, melting point 220 to 228 degrees centrigrade.

*Example 7.—5α,11β,17α-Trihydroxy-6β-Fluoro-21-Acetoxyallopregnane-3,20-Dione*

A solution of 0.47 gram of 5α,11β,17α-trihydroxy-6β-fluoro-21-acetoxyallopregnane-3,20-dione 3-ethylene ketal in 35 milliliters of acetone and four milliliters of 1 N sulfuric acid solution was gently boiled on the steam bath for ten minutes, cooled and neutralized with dilute sodium bicarbonate solution. Addition of water and cooling gave 0.33 gram of 5α,11β,17α-trihydroxy-6β-fluoro-21-acetoxyallopregnane-3,20-dione, melting point 230 to 240 degrees centigrade.

*Example 8.—6β-Fluoro-11β,17α-Dihydroxy-21 - Acetoxy-4-Pregnene-3,20-Dione (6β-Fluorohydrocortisone Acetate)*

A solution of 100 milligrams of 5α,11β,17α-trihydroxy-6β-fluoro-21-acetoxyallopregnane-3,20-dione in 4.9 milliliters of acetic acid and 0.1 milliliter of water was refluxed for a period of one hour, cooled, diluted with fifty milliliters of water and evaporated to dryness under reduced pressure. The residue was chromatographed over Florisil (synthetic magnesium silicate) to give one fraction (77 milligrams) eluted with methylene chloride plus ten percent acetone. Crystallization from acetone-Skellysolve B hexanes gave 38 milligrams of 6β-fluoro-11β,17α-dihydroxy-21-acetoxy-4-pregnene-3,20-dione (6β - fluorohydrocortisone acetate), melting point 210 to 218 degrees centigrade. Infrared data and ultraviolet data are in agreement with the structure.

*Example 9.—6β-Fluoro-11β,17α-Dihydroxy-21 Acetoxy-1,4-Pregnadiene-3,20-Dione*

A medium consisting of one percent dextrose hydrate, two percent cornsteep liquor of sixty percent solids and Kalamazoo tap water was adjusted to pH 4.9 sodium hydroxide. The medium was steam sterilized at fifteen pounds pressure for thirty minutes, cooled, and then inoculated with a 24-hour growth, from spores, of *Septomyxa affinis*, A.T.C.C. 6737. The medium was agitated, sparged with sterile air at the rate of one-tenth volume of air per volume of medium per minute. At the end of 24 hours of fermentation at room temperature, the pH was about 7.4. To this culture there was added a solution of 6β - fluoro - 11β,17α - dihydroxy - 21 - acetoxy-4-pregnene-3,20-dione (6β-fluorohydrocortisone acetate), dissolved in diethylformamide. The solution was prepared by dissolving five parts of the steroid in 100 parts of the solid and adding about ten cc. of the solution per liter of the medium. Fermentation was continued for a period of 48 hours whereupon the mycelium and beer were extracted thoroughly with methylene chloride. The extract was washed with sodium bicarbonate solution and then with water, dried and concentrated in vacuo to a slightly viscous residue. The residue, after reacetylation with acetic anhydride in pyridine, was fractionated chromatographically and 6β-fluoro-11β,17α-dihydroxy-21-acetoxy-1,4-pregnadiene-3,20-dione was recovered as a light-colored crystalline solid.

Following the procedure of Example 9, above, but substituting as starting material 9α,6-difluoro-11β,17α-dihydroxy-21-acetoxy-4-pregnene-3,20-dione and reacetylating the recovered crude product, there was produced 9α,6-difluoro - 11β,17α-dihydroxy-21-acetoxy-1,4-pregnadiene-3,20-dione as a white crystalline solid.

*Example 10*

Following the above procedure, but substituting the 6β-fluoro-11β,17α - dihydroxy - 21 - acetoxy-4-pregnane-3,20-dione (6β-fluorohydrocortisone acetate) by 6β-fluoro-17α-hydroxy-21-acetoxy-4-pregnene-3,11,20-trione (6β-fluorocortisone acetate) which was made by the oxidation of the product of Example 8 according to the methods disclosed in U.S. Patent 2,751,402, yielded 6β-fluoro-17α-hydroxy-21-acetoxy-1,4-pregnadiene-3,11,20-trione as a crystalline product.

In accordance with the foregoing examples, methyl 3,11-diketo-5α-hydroxy-6β-chloro-17(20)-allopregnen-21-oate can be substituted in the process of Example 3 to produce the 3-ketal thereof. The latter compound can then be subjected to reduction according to the process of Example 4 to produce 5α,11β,21-trihydroxy-6β-chloro-17(20)-allopregnen-3-one 3-ethylene ketal and the latter compound converted to its 21-acetate or other organic acid ester by the procedure of Example 5. Subjecting the thus-produced 5α,11β-dihydroxy-6β-chloro-21-acetoxy-17(20)-allopregnen-3-one 3-ethylene ketal to oxidative hydroxylation in accordance with Example 6, followed by hydrolysis of the 3-ketal group by the procedure of Example 7, and further dehydrating in accordance with the procedure of Example 8, is productive of 6β-chloro-11β,17α-dihydroxy-21-acetoxy-4-pregnene-3,20-dione (6β - chlorohydrocortisone acetate). The latter compound, when substituted in the procedure of Example 9, is productive of 6β-chloro-11β,17α - dihydroxy - 21 - acetoxy - 1,4-pregnadiene-3,20-dione. Furthermore, 6β-chlorohydrocortisone acetate can be oxidized to 6β-chlorocortisone acetate as shown above for the 6β-fluoro analogue. Substitution of 6β-chlorocortisone acetate in the process of Example 9 is productive of 6β-chloro-11β,17α-dihydroxy-21-acetoxy-1,4-pregnadiene-3,20-dione.

As previously described, the 21-acyloxy products of this invention, e.g., the products of Examples 9 and 10 or the corresponding 6β-chloro analogues thereof, can be hydrolyzed to the corresponding free 21-alcohols by the hydrolysis procedure described above. In the hydrolysis procedure, as previously stated, it is desirous to employ an oxygen-free solution and oxygen-free conditions and to use a molar excess of an alkali-metal bicarbonate such as potassium bicarbonate as a hydrolytic agent. The temperature is preferably held lower, i.e., between ten and about thirty degrees centigrade, and the hydrolyzed solution subsequently neutralized with an acid such as acetic acid.

The compounds disclosed in Examples 9 and 10 and their 6β-chloro analogues possess valuable anti-rheumatoid arthritic, anti-inflammatory activity and can be used and administered as disclosed in the foregoing description.

*Example 11.—Isomerization of 6β- to 6α-Fluorohydrocortisone 21-Acetate*

A solution of 0.132 gram of 6β-fluorohydrocortisone 21-acetate in twelve milliliters of chloroform and 0.1 milliliter of absolute alcohol was cooled to minus ten degrees centigrade in an ice-salt bath and a stream of anhydrous hydrochloric acid was gently bubbled through the solution for 2.5 hours while the temperature was maintained between minus five and minus fifteen degrees centigrade. The solution was then diluted with 25 milliliters of chloroform, washed with dilute sodium bicarbonate and water, dried over anhydrous sodium sulfate, and evaporated to dryness under reduced pressure at sixty degrees centigrade or less. Crystallization of the residue from acetone-Skellysolve B gave 42 milligrams of product, 6α-fluorohydrocortisone 21-acetate, melting point 203 to 210 degrees centigrade.

In a similar manner, 6β-fluoro-11β,17α-dihydroxy-21-acetoxy-1,4-pregnadiene-3,20-dione is converted to 6α-fluoro - 11β,17α - dihydroxy-21-acetoxy--1,4-pregnadiene-3,20-dione, and 6β,9α-difluoro-11β,17α-dihydroxy-21-acetoxy-1,4-pregnadiene-3,20-dione is converted to 6α,9α-difluoro - 11β,17α - dihydroxy-21-acetoxy-1,4-pregnadiene-3,20-dione.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. 6 - chloro - 11 - oxygenated-17α,21-dihydroxy-1,4-pregnadiene-3,20-dione of the following formula:

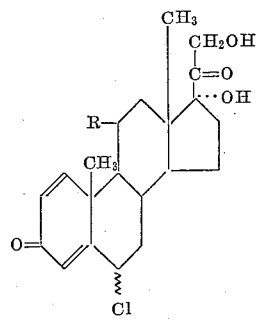

wherein R is a member selected from the group consisting of β-hydroxy and keto; and the 21-acylates thereof wherein the acyl radical is that of a hydrocarbon carboxylic acid containing from one to twelve carbon atoms, inclusive.

2. 6-chloro-1-dehydrohydrocortisone.
3. 6-chloro-1-dehydrocortisone.

4. 6-chloro-1-dehydrohydrocortisone 21-acetate.
5. 6α-chloro-1-dehydrohydrocortisone 21-acetate.
6. 6-chloro-1-dehydrocortisone 21-acetate.
7. 6α-chloro-1-dehydrocortisone 21-acetate.
8. A compound represented by the formula:
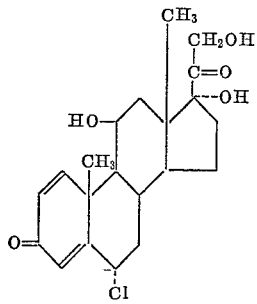
9. A compound represented by the formula:
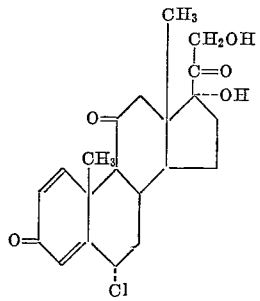
References Cited in the file of this patent
UNITED STATES PATENTS
| | | |
|---|---|---|
| 2,837,464 | Nobile | June 3, 1958 |
| 2,881,168 | Spero | Apr. 7, 1959 |